United States Patent
Kao et al.

(10) Patent No.: US 8,503,764 B2
(45) Date of Patent: *Aug. 6, 2013

(54) METHOD FOR GENERATING IMAGES OF MULTI-VIEWS

(75) Inventors: Meng-Chao Kao, Taipei (TW); Chien-Hung Chen, Tucheng (TW); Tzu-Chiang Shen, Dayuan Township, Taoyuan County (TW)

(73) Assignee: Chunghwa Picture Tubes, Ltd., Taoyuan County (TW)

( * ) Notice: Subject to any disclaimer, the term of this patent is extended or adjusted under 35 U.S.C. 154(b) by 429 days.

This patent is subject to a terminal disclaimer.

(21) Appl. No.: 12/948,957

(22) Filed: Nov. 18, 2010

(65) Prior Publication Data

US 2012/0020548 A1  Jan. 26, 2012

(30) Foreign Application Priority Data

Jul. 20, 2010 (TW) ................................ 99123878 A

(51) Int. Cl.
*G06K 9/00* (2006.01)

(52) U.S. Cl.
USPC .......................................... 382/154; 382/285

(58) Field of Classification Search
USPC .. 382/154, 285; 715/757, 852; 345/FOR. 209
See application file for complete search history.

(56) References Cited

U.S. PATENT DOCUMENTS

| 8,345,041 | B2 * | 1/2013 | Kim et al. ...................... 345/419 |
| 8,351,689 | B2 * | 1/2013 | Turner et al. ................... 382/162 |
| 2009/0003728 | A1 * | 1/2009 | Ernst et al. ..................... 382/285 |
| 2010/0225740 | A1 * | 9/2010 | Jung et al. ......................... 348/42 |
| 2010/0322535 | A1 * | 12/2010 | Chen et al. ..................... 382/285 |
| 2011/0074925 | A1 * | 3/2011 | Turner et al. .................... 348/46 |

FOREIGN PATENT DOCUMENTS

| CN | 101180653 | 10/2006 |
| CN | 101697597 | 4/2010 |
| CN | 101621707 | 5/2011 |

* cited by examiner

*Primary Examiner* — Brian Le
(74) *Attorney, Agent, or Firm* — Ming Chow; Sinorica, LLC

(57) ABSTRACT

The present invention provides a method for generating images of multi-views. The method includes obtaining a 2D original image of an article and background figures of multi-views; calculating the background image range and the main body image range of the 2D original image of the article; cutting the main body image out; generating a depth model according to an equation; cutting the depth model according to the main body image range of the cut 2D image of the article; shifting every pixel in the main body image of the 2D original image of the article according to the cut depth model to obtain shifted main body images of multi-views; and synthesizing the shifted main body images of multi-views and the background figures of multi-views to obtain the final images of multi-views for 3D image reconstruction.

8 Claims, 11 Drawing Sheets
(4 of 11 Drawing Sheet(s) Filed in Color)

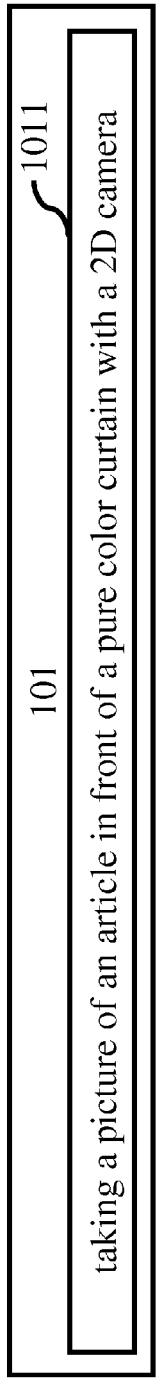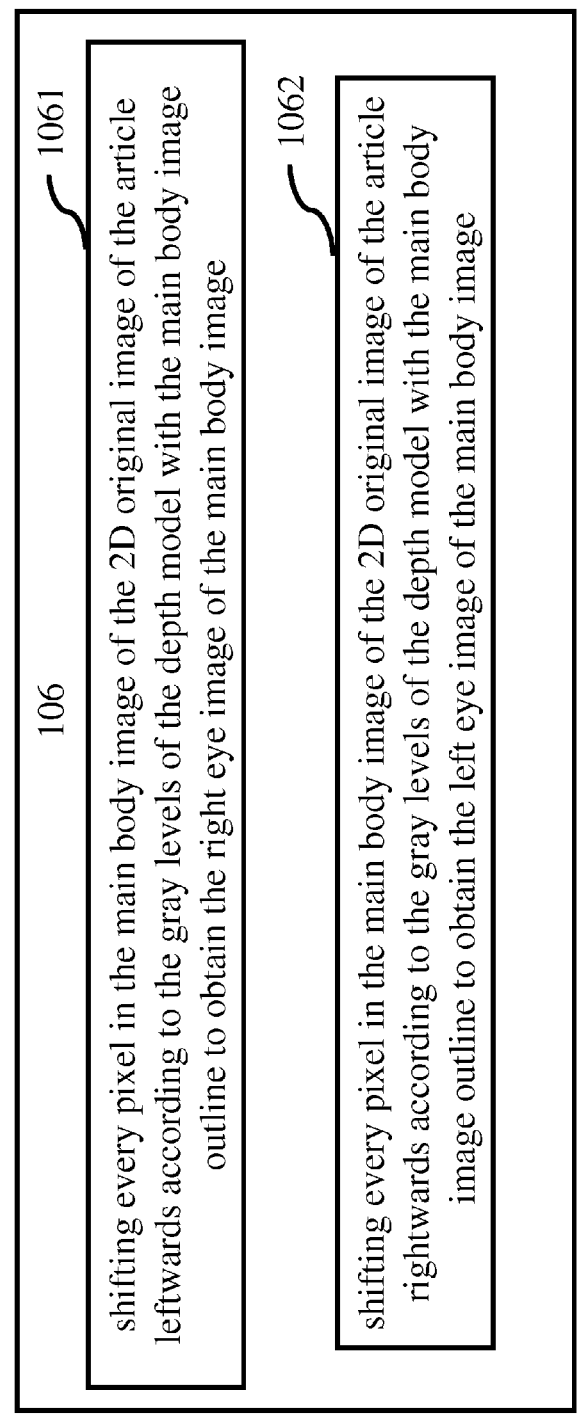
Fig. 2
Fig. 3

METHOD FOR GENERATING IMAGES OF MULTI-VIEWS

FIELD OF THE INVENTION

The present invention relates to three dimensional images, and more particularly to a method for generating images of multi-views.

BACKGROUND OF THE INVENTION

Three dimensional auto-stereoscopic image display technology has become the current trend in the image display technology field. Generally, three dimensional image display device can be classified as a glasses type and a bare-eye type. No matter what types of the three dimensional image display devices are used, the three dimensional image display devices render the user to see only a left eye image through the left eye and only a right eye image through the right eye.

In the glasses type 3D image display devices, the most common ones involve the usage of polarization glasses, anaglyph glasses, shutter glasses, pulfrich glasses and a head mounted display. In the bare-eye type 3D image display devices, the most common ones are a holographic type, a volumetric type, and a multiplexed 2-D type. The multiplexed 2-D type can be classified as a spatial-multiplexed type, a time-multiplexed type and a tracking-based type.

If the bare-eye type 3D image display device, by which the user can see auto-stereoscopic images without wearing any special devices, is designed based on the binocular parallax, the specific bare-eye type 3D image display device is referred to as a parallax based bare-eye type 3D image display device. This 3D image display device disposes a barrier for example a parallax shield or a grating in front of light source arrays of a display for example a liquid crystal display, and the light source arrays transmit the left eye images and the right eye images sequentially to render the left eye and the right eye of the user to receive the left eye image and the right eye image independently through the parallax shield. Moreover, the technology which enables the user to see auto-stereoscopic images without wearing any special devices also includes integral photography auto-stereoscopic display technology. The main technical theorem involves that holo-colored auto-stereoscopic images are recorded through a fly's-eye lens, where the fly's-eye lens is a micro convex lens array arranged like a fly's eye, i.e. a plurality of hemispheric small lenses arranged on a plane, to capture or display images.

However, no matter what types of devices are used to present the three dimensional images, the means used to generate different information for the left eye and the right eye are similar. Generally, the signal source has to provide different images for the left eye and the right eye respectively. That is to say, two cameras are needed to capture the left eye image and the right eye image. Therefore, a auto-stereoscopic camera with two lenses is utilized to capture the left eye image and the right eye image in the conventional technique, and the left eye image and the right eye image are then output to the three dimensional display device to form a auto-stereoscopic image. However, the auto-stereoscopic camera with two lenses can not be available easily to a common user because they are expensive. The user is unlikely to buy a three dimensional display device and enjoys no fun of the three dimensional images because the three dimensional image contents are not available. It is therefore hard to popularize the three dimensional display device for example a three dimensional display. Accordingly, there is still a need for a technical solution which can solve the aforementioned problems of lack of the three dimensional image contents.

SUMMARY OF THE INVENTION

To solve the aforementioned problems of lack of the three dimensional image contents, the present invention provides a method for generating images of multi-views.

In one aspect, the present invention provides a method for generating images of multi-views, comprising obtaining a 2D original image of an article and background figures of multi-views, wherein the 2D original image of the article includes a main body image and a background image; calculating the range of the background image and the range of the main body image of the 2D original image of the article by a processing unit; cutting the main body image of the 2D original image of the article out to generate a cut 2D image of the article; generating a depth model according to an equation; cutting the depth model according to the range of the main body image of the cut 2D image of the article to generate a depth model with a main body image outline; shifting every pixel in the main body image of the 2D original image of the article respectively according to the depth model with the main body image outline to obtain shifted main body images of multi-views; and synthesizing the shifted main body images of multi-views and the background figures of multi-views to obtain final images of multi-views for 3D image reconstruction.

One advantage of the present invention is that the present invention can make images of multi-views, for example the left eye image and the right eye image, for 3D image reconstruction by only utilizing a 2D camera in cooperation with the system and the method without an expensive three dimensional camera.

Another advantage of the present invention is that the present invention can render the three dimensional image contents to be easy to be available. The acceptance of the three dimensional display device is improved and the development of the three dimensional display device is accelerated.

Still another advantage of the present invention is that the three dimensional images formed by the method and the system may contain the depth of field in both the background and the main body image and will eliminate the montage issue.

These and other advantages will become apparent from the following description of preferred embodiments taken together with the accompanying drawings and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention may be understood by some preferred embodiments and detailed descriptions in the specification and the attached drawings below. The identical reference numbers in the drawings refer to the same components in the present invention. However, it should be appreciated that all the preferred embodiments of the invention are only for illustrating but not for limiting the scope of the Claims and wherein:

FIG. 2 illustrates a flow chart of the method for generating images of multi-views for 3D image reconstruction in accordance with one embodiment of the present invention;

FIG. 3 illustrates a flow chart of the method for generating images of multi-views for 3D image reconstruction in accordance with one embodiment of the present invention;

DETAILED DESCRIPTION OF THE PREFERRED EMBODIMENT

The invention will now be described with the preferred embodiments and aspects and these descriptions interpret structure and procedures of the invention only for illustrating but not for limiting the Claims of the invention. Therefore, except the preferred embodiments in the specification, the present invention may also be widely used in other embodiments.

The present invention provides a method, a system and a computer readable medium for generating images of multi-views, for example a left eye image and a right eye image, for 3D image reconstruction. The multi-view images refer to the images viewed from two or more different sites. The method of the present invention mainly utilizes the background image detecting technique in cooperation with the depth model, the depth image based rendering (DIBR) algorithm and the image synthesis technique to generate multi-view images, for example the left eye image and the right eye image or the multi-view images, for 3D image reconstruction by using a traditional 2D camera, so as to present the three dimensional images by using various kinds of different three dimensional display devices.

Figure 1:
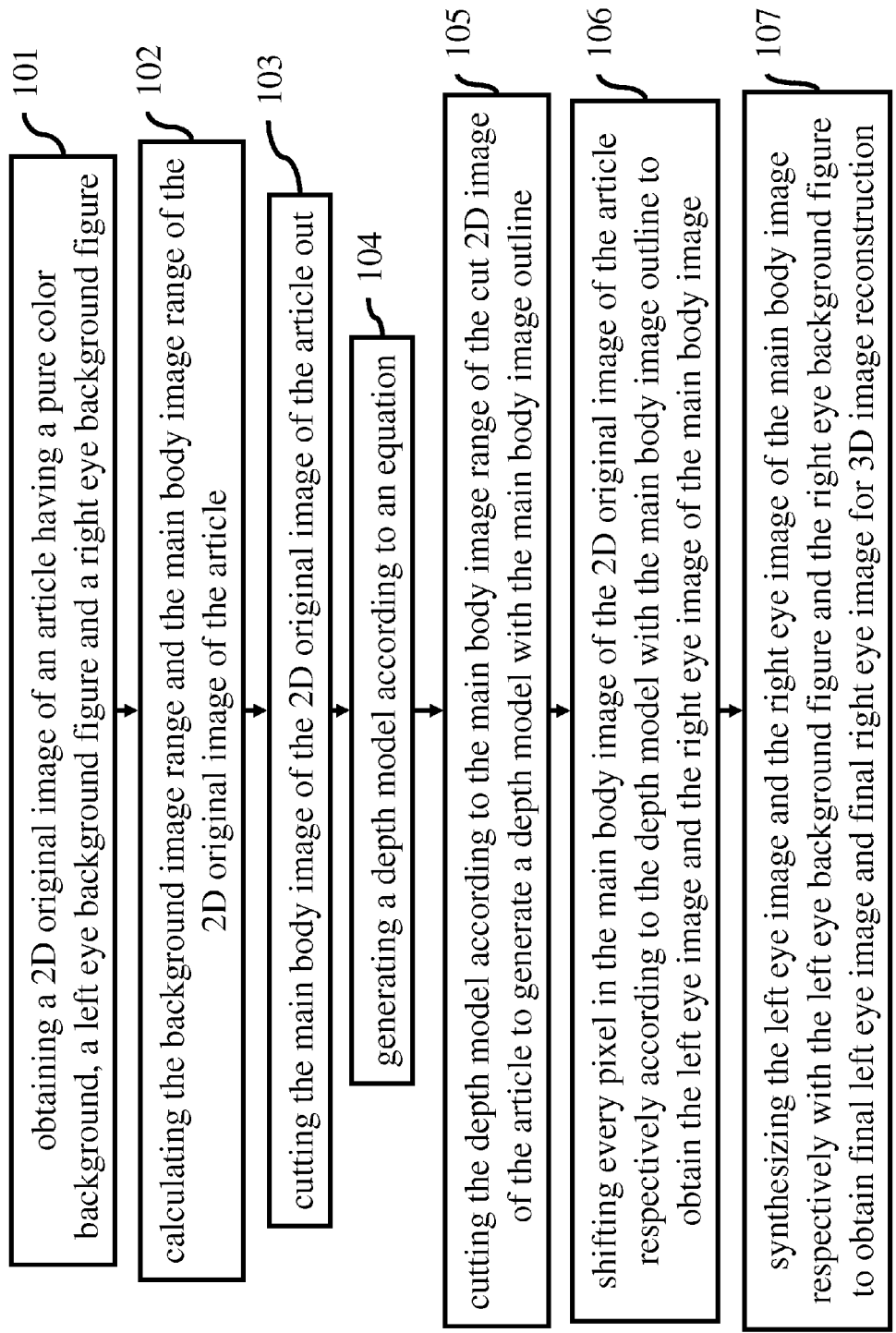
FIG. 1 illustrates a flow chart of a method for generating images of multi-views for 3D image reconstruction in accordance with one embodiment of the present invention.
Figure 7:
FIG. 7 illustrates an example of a 2D original image of the article having a pure color background in accordance with one embodiment of the present invention.

As shown in FIG. 1, in one embodiment of the present invention, the method for generating the left eye image and the right eye image for 3D image reconstruction includes obtaining a 2D original image of an article having a pure color background, a left eye background figure and a right eye background figure in step 101. The article may refer to people, items or anything. Then, the 2D original image of the articles such as people or items is stored into a storage medium in step 101. In one embodiment of the present invention, the pure color background may be a single color background, such as a blue background, a green background or backgrounds with any other colors which are not similar to the color of the articles. The blue background may include a mazarine background. In one embodiment of the present invention, as shown in FIGS. 2 and 7, step 101 includes a step of taking a picture of the articles in front of a pure color curtain with a 2D camera in step 1011. The pure color curtain may include a blue curtain, a green curtain or curtains with any other colors which are not similar to the color of the article such as people or items. Subsequently, as shown in FIG. 1, the background image range and the main body image range of the 2D original image of the article are calculated by a processing unit in step 102. The main body image is the image of the article while the background image is the image of the pure color background. In one embodiment of the present invention, each color value, for example the red value (R), the green value (G) and the blue value (B), of every pixel in the 2D original image of the article such as people or items is calculated by the processing unit. If the value generated by subtracting the green value (G) of one specific pixel in the 2D original image of the article from the blue value (B) of the specific pixel is larger than 20 and the green value (G) is larger than the red value (R), the specific pixel is determined as the background image range. If not, the specific pixel is determined as the main body image range.

Figure 8:
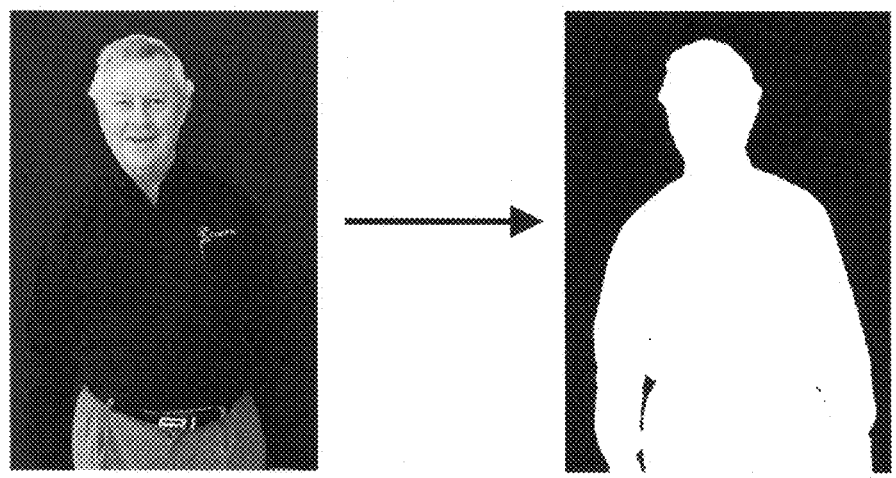
FIG. 8 illustrates a diagram showing the cutting procedure of the main body image in accordance with one embodiment of the present invention.
Figure 9:
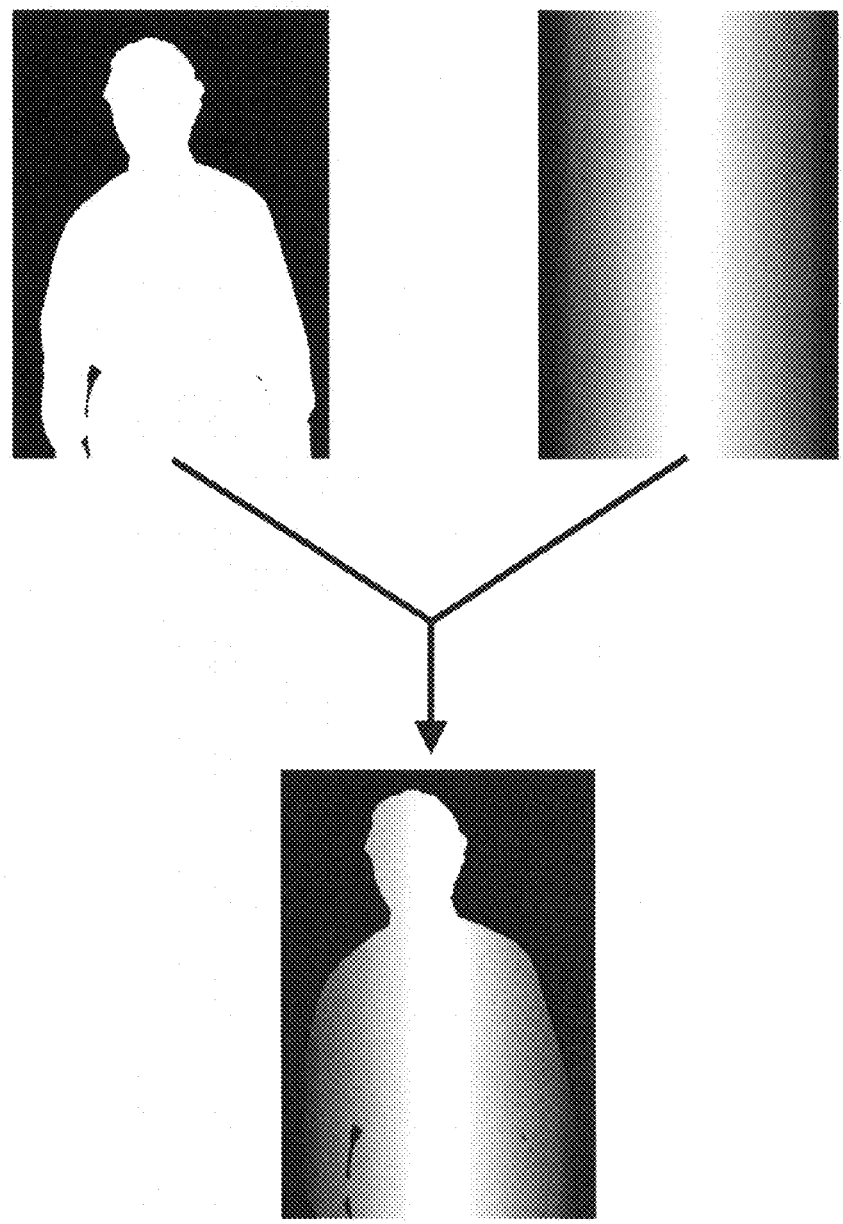
FIG. 9 illustrates a diagram showing the cutting procedure of the depth model in accordance with one embodiment of the present invention.
Figure 12:
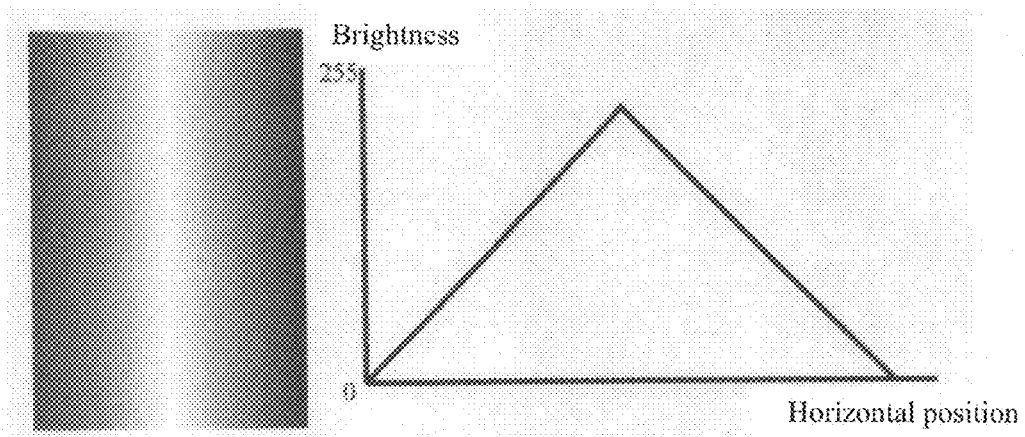
FIG. 12 illustrates a diagram showing the depth model and the relationship between the brightness and the horizontal position thereof in accordance with one embodiment of the present invention.
Figure 13:
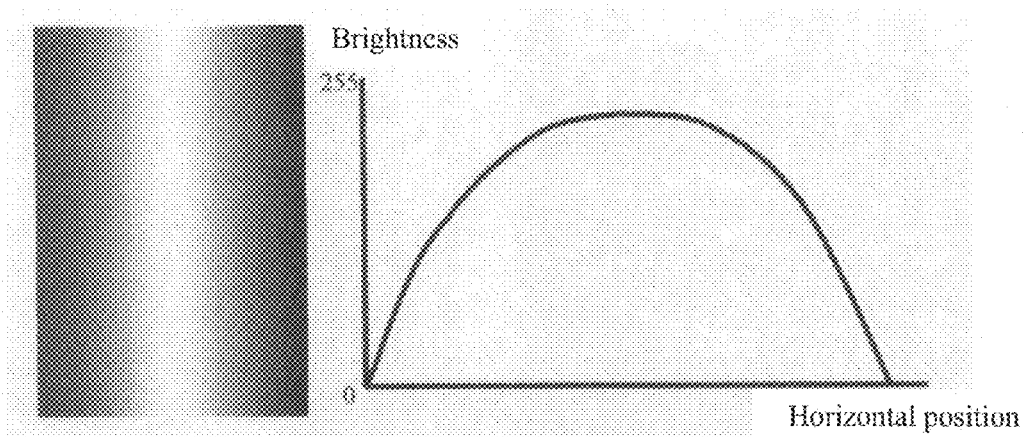
FIG. 13 illustrates a diagram showing the depth model and the relationship between the brightness and the horizontal position thereof in accordance with another embodiment of the present invention.

Then, as shown in FIGS. 1 and 8, the main body image of the 2D original image of the article is cut out to generate the cut 2D image of the article such as people or items in step 103. Subsequently, as shown in FIG. 1, a depth model is generated according to an equation in step 104. The center of the depth model is brighter than the two peripheral areas of the depth model. The brightness value of the center is 255 while the brightness value of the two peripheral areas is 0. The brightness values of the areas are gradually decayed from the center to the two peripheral areas. In one embodiment, the equation includes a linear equation as shown in FIG. 12. In another embodiment, the equation includes a nonlinear equation, for example Gamma curve as shown FIG. 13. In still another embodiment, the equation includes a polynomial equation. In yet another embodiment, the equation is as follows: the brightness value of the left half portion of the depth model= (horizontal position/(width/2))^0.45×255, the brightness value of the right half portion of the depth model=((width−horizontal position)/(width/2))^0.45×255. Then, as shown in FIGS. 1 and 9, the depth model is cut according to the main body image range of the cut 2D image of the article such as people or items to generate a merged depth model with the main body image outline in step 105.

Figure 10:
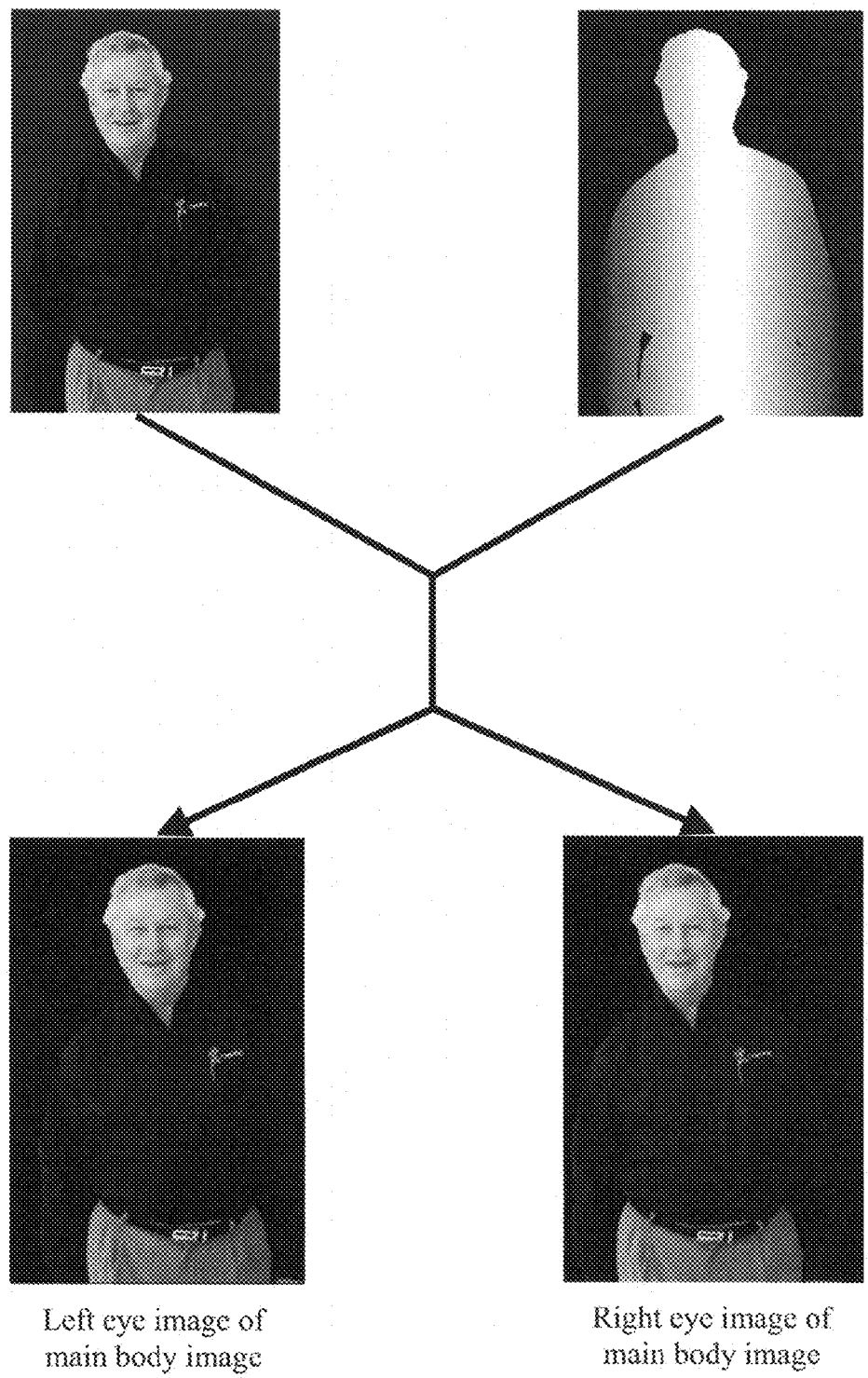
FIG. 10 illustrates a diagram showing the shifting procedure of the pixels in the main body image in accordance with one embodiment of the present invention.
Figure 11:
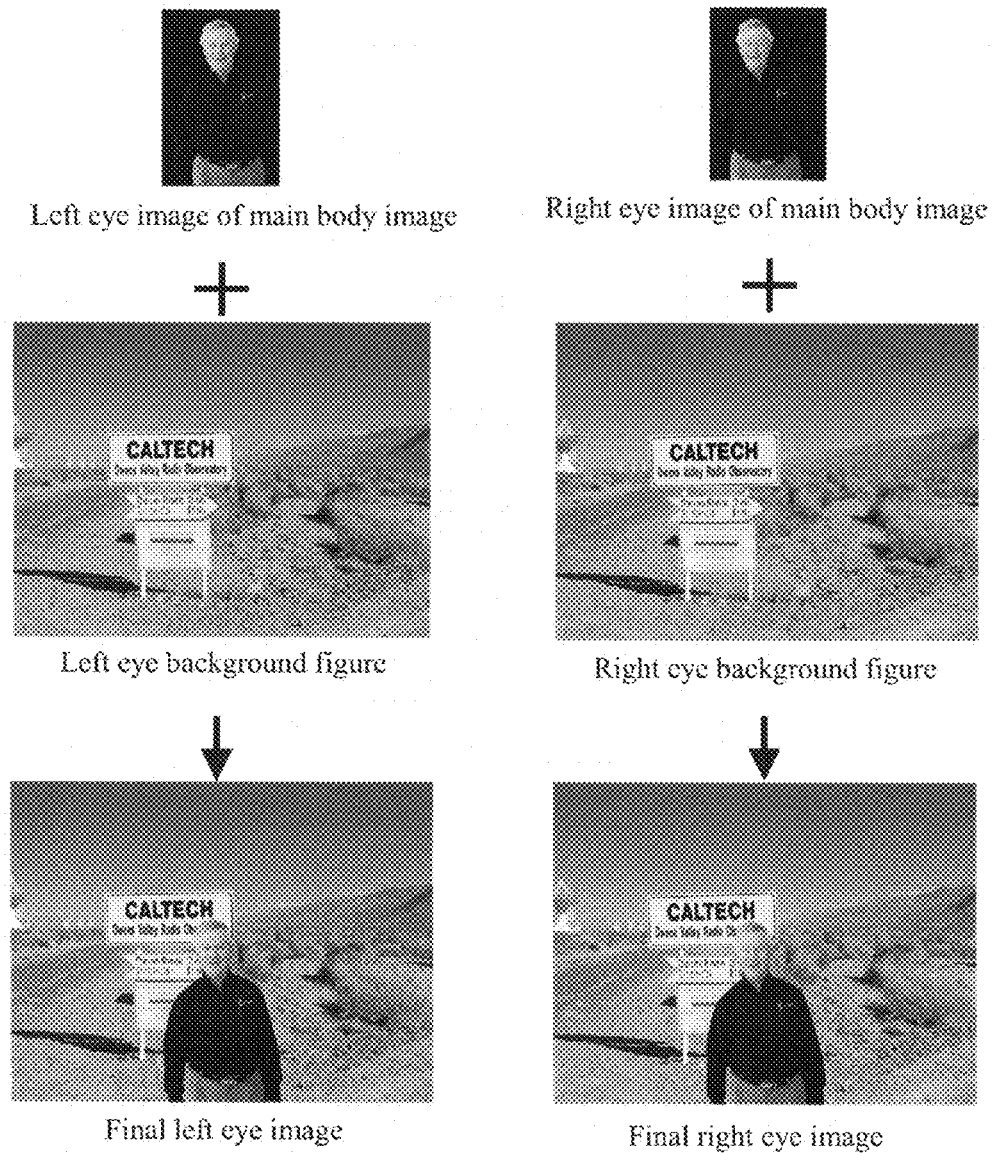
FIG. 11 illustrates a diagram showing the synthesis procedure of the main body images and the background figures of different views in accordance with one embodiment of the present invention.

Subsequently, as shown in FIGS. 1 and 10, every pixel in the main body image of the 2D original image of the article is shifted with the depth image based rendering (DIBR) algorithm according to the depth model with the main body image outline to obtain the left eye image of the main body image and the right eye image of the main body image in step 106. As shown in FIG. 3, step 106 may include step 1061 and step 1062. In one embodiment, every pixel in the main body image of the 2D original image of the article is shifted leftwards according to the gray levels of the depth model with the main body image outline to obtain the right eye image of the main body image in step 1061. In another embodiment, every pixel in the main body image of the 2D original image of the article is shifted rightwards according to the gray levels of the depth model with the main body image outline to obtain the left eye image of the main body image in step 1062. If the gray level of one specific pixel in the depth model with the main body image outline is larger, the shift level of the pixel in the 2D original image of the article corresponding to the position of the specific pixel in the depth model will be larger. The gray level of the center of the depth model is the largest, and the gray levels of the two peripheral areas of the depth model are the smallest. Therefore, if one specific position is closer to the center of the main body image, the shift level of the specific position is larger. If one specific position is closer to the two peripheral areas of the main body image, the shift level of the specific position is smaller. Then, as shown in FIGS. 1 and 11, the left eye image of the main body image and the right eye image of the main body image are synthesized respectively with the left eye background figure and the right eye background figure to obtain final left eye image and final right eye image for 3D image reconstruction in step 107. In one embodiment of the present invention, the left eye background figure and the right eye background figure can be downloaded from the internet or be obtained by taking a picture of a desired background, for example a scene, from two different angles of view with a 2D camera. The final left eye image and the final right eye image for 3D image reconstruction may be output to various kinds of three dimensional display devices, for example the glasses type three dimensional display device, the bare-eye type three dimensional display device or multi-view three dimensional display device, to display the final left eye image and the final right eye image as a three dimensional image by utilizing different image reconstructing methods.

Figure 4:
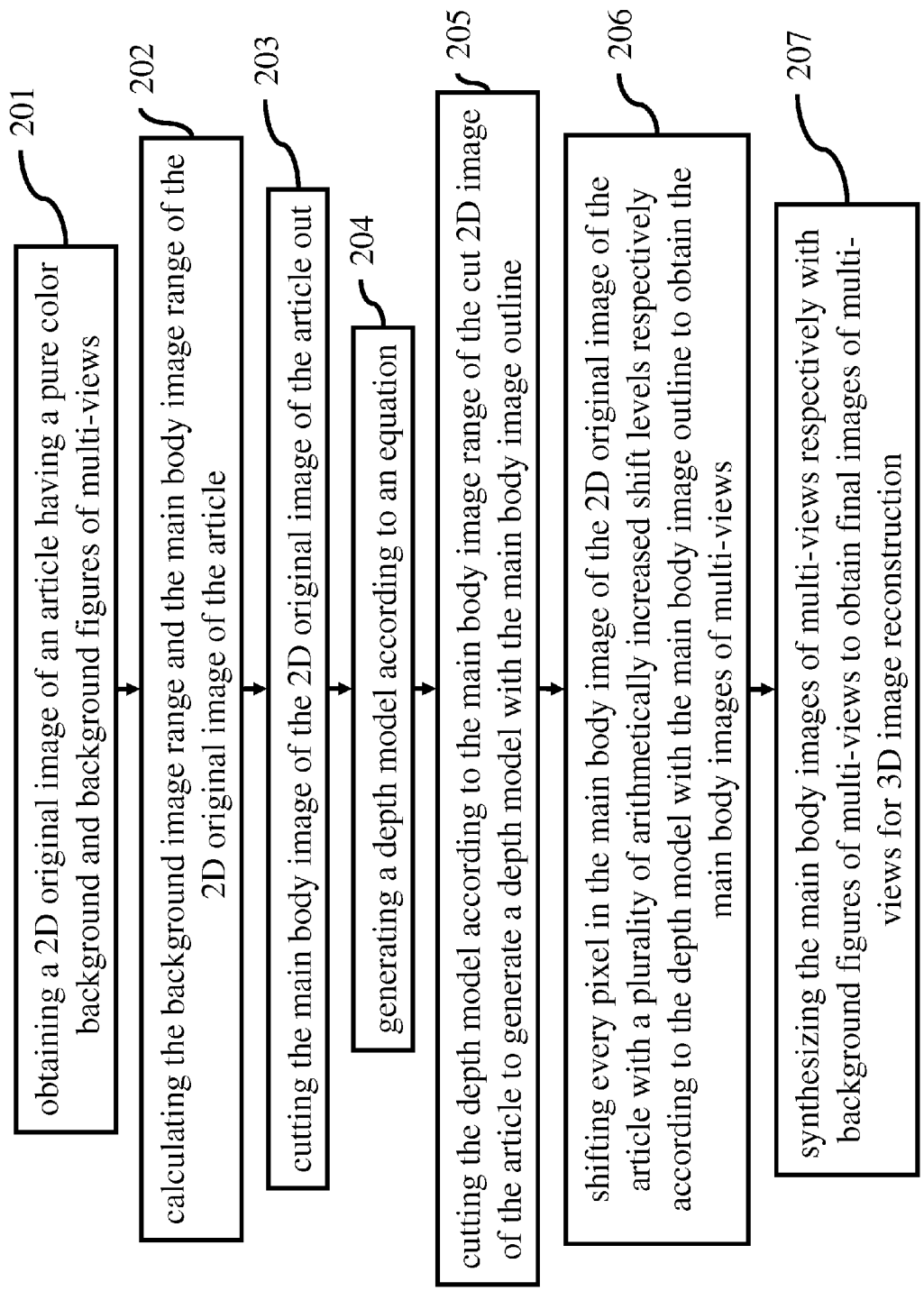
FIG. 4 illustrates a flow chart of a method for generating images of multi-views for 3D image reconstruction in accordance with another embodiment of the present invention.
Figure 5:
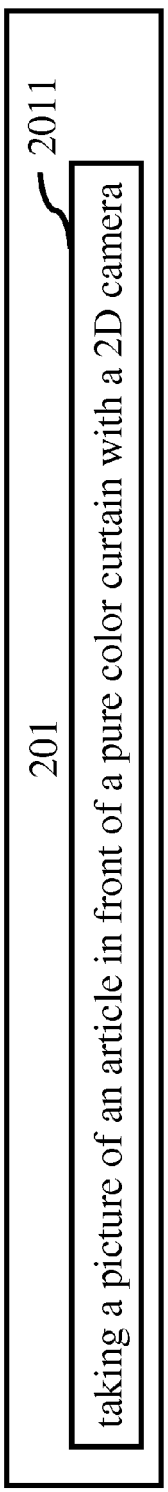
FIG. 5 illustrates a flow chart of the method for generating images of multi-views for 3D image reconstruction in accordance with another embodiment of the present invention.
Figure 6:
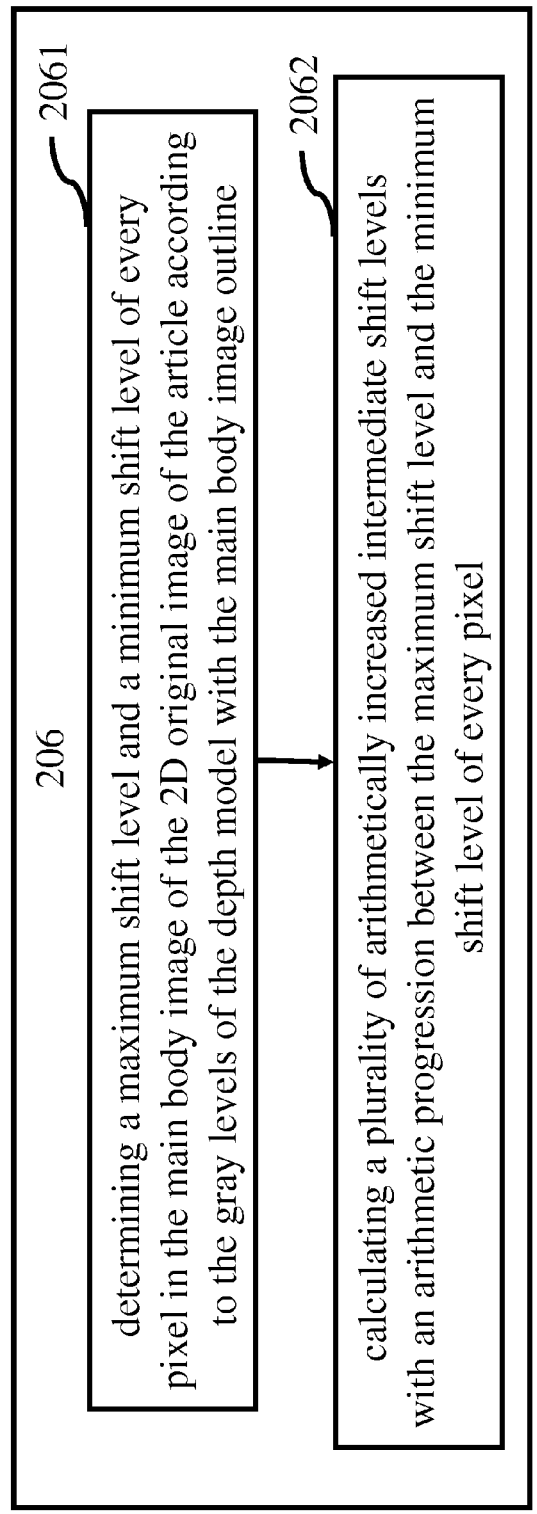
FIG. 6 illustrates a flow chart of the method for generating images of multi-views for 3D image reconstruction in accordance with another embodiment of the present invention.

As shown in FIGS. 4 and 5, in another embodiment of the present invention, the method of the present invention includes step 201 to step 205 and step 2011 which are similar to step 101 to step 105 and step 1011 in the aforementioned embodiment and therefore the redundant descriptions are omitted. As shown in FIG. 4, every pixel in the main body image of the 2D original image of the article is shifted with a plurality of arithmetically increased shift levels respectively by using the depth image based rendering (DIBR) algorithm according to the depth model with the main body image outline to obtain the main body images of multi-views in step 206. As shown in FIG. 6, step 206 includes step 2061 and step 2062. In one embodiment, a maximum shift level and a minimum shift level of every pixel in the main body image of the 2D original image of the article are determined according to the gray levels of the depth model with the main body image outline in step 2061. Then, arithmetically increased intermediate shift levels are calculated with an arithmetic progression between the maximum shift level and the minimum shift level of every pixel in step 2062. Subsequently, as shown in FIG. 4, the main body images of multi-views are synthesized respectively with background figures of multi-views to obtain final images of multi-views for 3D image reconstruction in step 207. In one embodiment of the present invention, the background figures of multi-views can be downloaded from the internet or be obtained by taking a picture of a desired background, for example a scene, from multiple different angles of view with a 2D camera. The final images of multi-views for 3D image reconstruction may be output to various kinds of three dimensional display devices, for example the glasses type three dimensional display device, the bare-eye type three dimensional display device or multi-view three dimensional display device, to utilize different image reconstructing methods to display the final images of multi-views as a three dimensional image.

Figure 14:
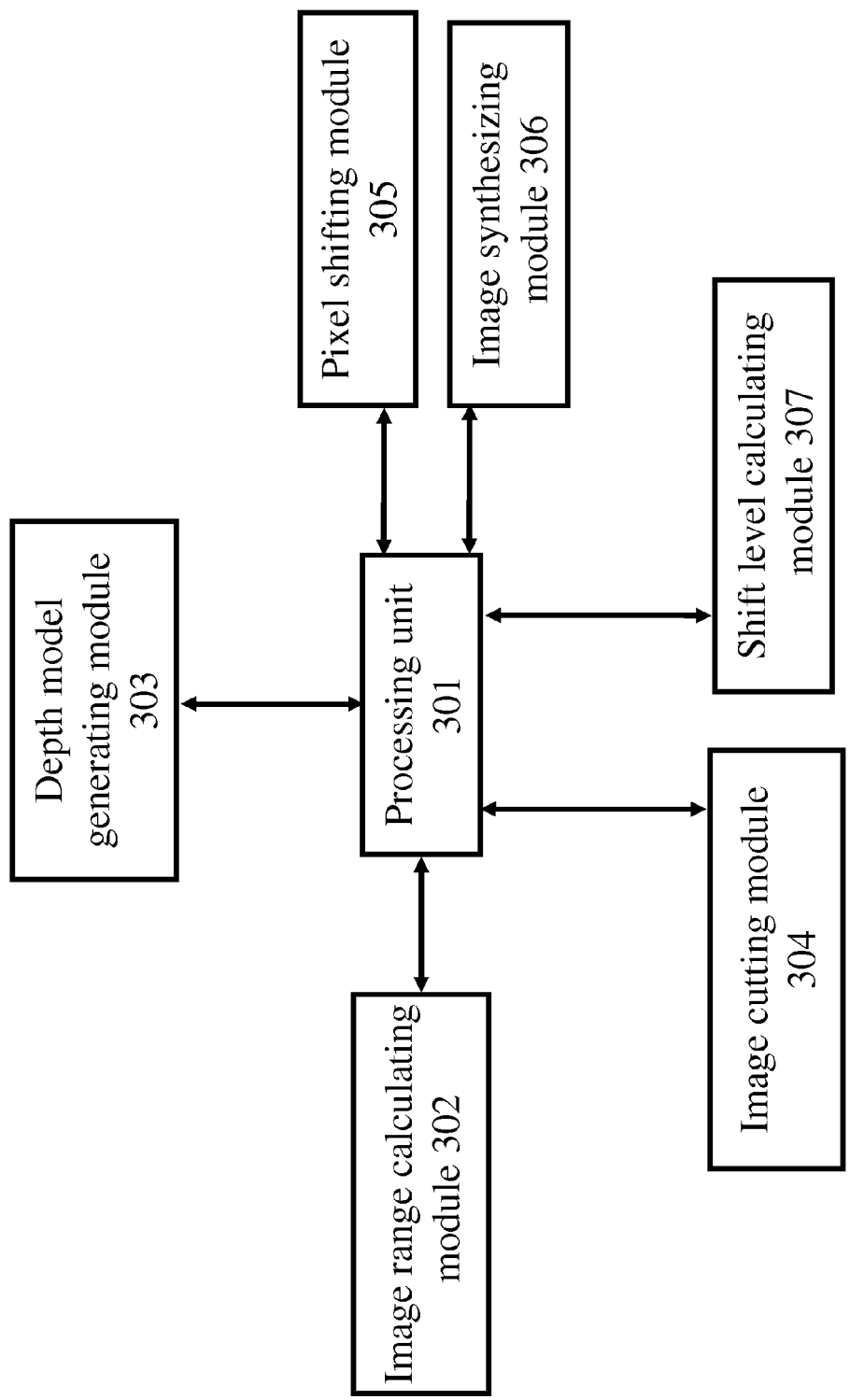
FIG. 14 illustrates a block diagram of a system for generating images of multi-views for 3D image reconstruction in accordance with another embodiment of the present invention.

As shown in FIG. 14, in still another embodiment of the present invention, the present invention provides a system for generating images of multi-views for 3D image reconstruction. The system includes a processing unit 301, an image range calculating module 302, a depth model generating module 303, an image cutting module 304, a pixel shifting module 305 and an image synthesizing module 306. The image range calculating module 302, the depth model generating module 303, the image cutting module 304, the pixel shifting module 305 and the image synthesizing module 306 are coupled to the processing unit 301 respectively. In one embodiment, the system further includes a shift level calculating module 307 coupled to the processing unit 301. The image range calculating module 302 is utilized to calculate a background image range and a main body image range of a 2D original image of the article. The depth model generating module 303 is utilized to generate a depth model according to an equation. The equation includes a linear equation and a nonlinear equation. Preferably, the nonlinear equation includes a Gamma curve. In one embodiment, the equation includes a polynomial equation. The image cutting module 304 is employed to cut the 2D original image of the article or the depth model to generate a cut 2D image of the article or a depth model with the main body image outline. The pixel shifting module 305 is introduced to shift every pixel in the main body image of the 2D original image of the article according to the gray levels of the depth model with the main body image outline to obtain the shifted main body images of multi-views. The image synthesizing module 306 is utilized to synthesize the shifted main body images of two or more views and the background figures of two or more views to obtain final images of two or more views for 3D image reconstruction. The shift level calculating module 307 is utilized to calculate two or more pairs of arithmetic shift levels according to the gray levels of the depth model with the main body image outline in order for the pixel shifting module 306 to shift every pixel in the 2D original image of the article.

Figure 15:
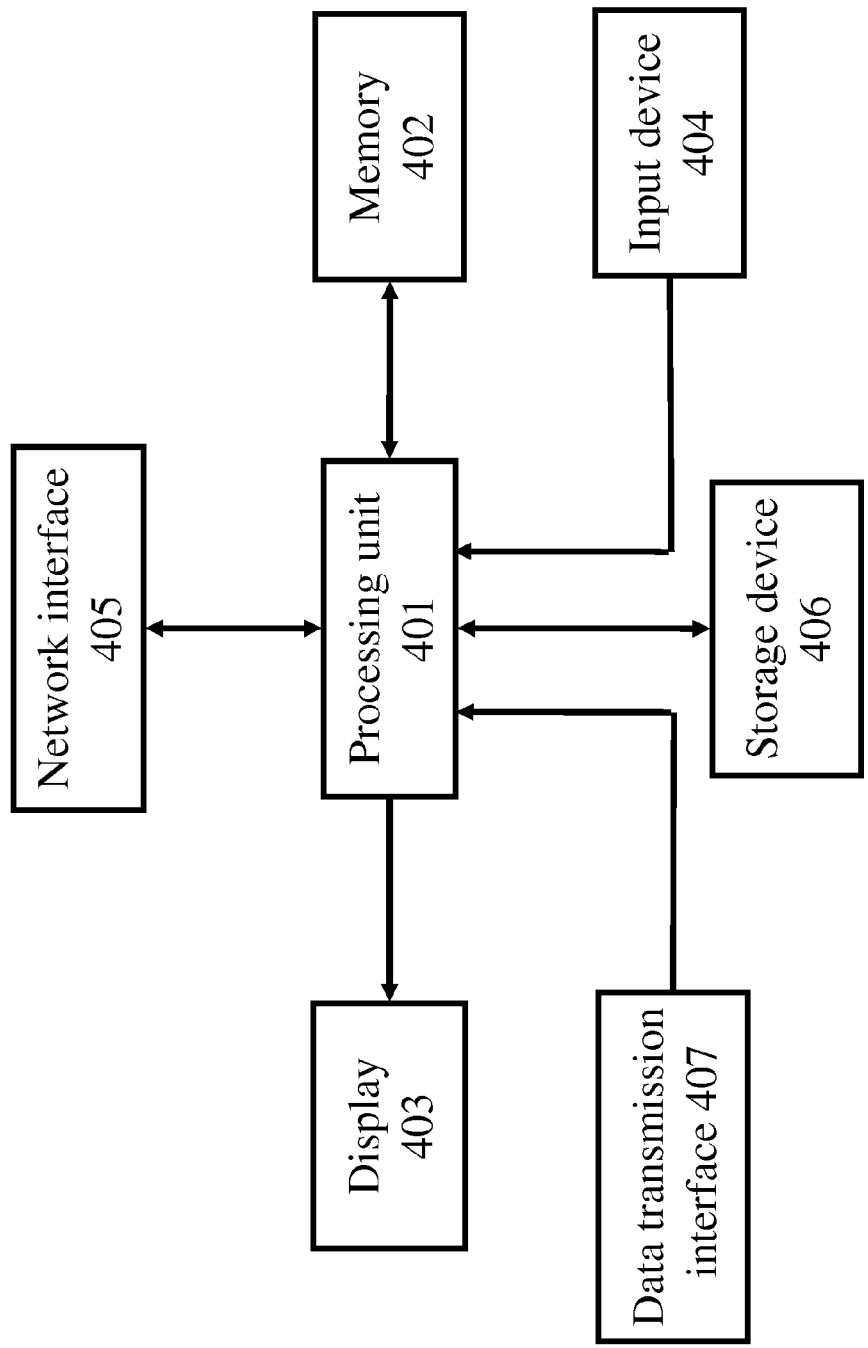
FIG. 15 illustrates a block diagram of an example of a computer system cooperating with the method and the system of the present invention in accordance with one embodiment of the present invention.

The method and the system for generating images of multi-views for 3D image reconstruction of the present invention can be performed in cooperation with a computer system as follows. The computer system is shown for illustrating but not for limiting the present invention. As shown in FIG. 15, the computer system includes a processing unit 401, a memory 402, a display 403, an input device 404, a network interface 405, a storage device 406 and a data transmission interface 407. The memory 402, the display 403, the input device 404, the network interface 405, the storage device 406 and the data transmission interface 407 are coupled to the processing unit 401 respectively. The input device 404 may include a keyboard, a keypad or a mouse. The storage device 406 may include a hard disk drive or a floppy drive. The network interface 405 may include a wired network interface or a wireless network interface. The data transmission interface 407 may include a wired data transmission interface and a wireless data transmission interface. The wired data transmission interface may include universal serial bus (USB) and IEEE1394. The wireless data transmission interface may include BLUETOOTH and infrared (IR).

The present invention may also be performed in other alternative forms besides the aforementioned embodiments. In an alternative embodiment, the present invention provides a computer readable medium containing computer program instructions, which when executed by a computer, cause the computer to perform any of the aforementioned methods. It should be appreciated that the computer readable medium may be floppy drive, hard disk drive or any other mediums used to long-termly store computer executable instructions.

Accordingly, the method, the system and the computer readable medium for generating images of multi-views for 3D image reconstruction provided by the present invention can generate multi-view images, for example the left eye image and the right eye image or multi-view images, for 3D image reconstruction by only utilizing a 2D camera in cooperation with the system and the method without an expensive three dimensional camera. Therefore, the three dimensional image contents can be easily obtained. The acceptance of the three dimensional display device can be improved and the development of the three dimensional display device can be accelerated. The three dimensional images formed from the multi-view images generated by the present method and the system can contain the depth of field in both the background and the main body image and the issue of montage will not occurs.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the invention. It is intended that all such modifications and alterations are included insofar as they come within the scope of the invention as claimed or the equivalents thereof.

What is claimed is:

1. A method for generating images of multi-views for 3D image reconstruction, comprising:
    obtaining a 2D original image of an article and background figures of multi-views, wherein said 2D original image of said article includes a main body image and a background image;
    calculating the range of said background image and the range of said main body image of said 2D original image of said article by a processing unit;
    cutting said main body image of said 2D original image of said article out to generate a cut 2D image of said article;
    generating a depth model according to an equation;
    cutting said depth model according to said range of said main body image of said cut 2D image of said article to generate a depth model with a main body image outline;
    shifting every pixel in said main body image of said 2D original image of said article respectively according to said depth model with said main body image outline to obtain shifted main body images of multi-views; and
    synthesizing said shifted main body images of multi-views and said background figures of multi-views to obtain final images of multi-views for 3D image reconstruction.

2. The method of claim 1, wherein said step of obtaining said 2D original image of said article comprises a step of taking a picture of said article in front of a pure color curtain with a 2D camera.

3. The method of claim 1, wherein said every pixel in said main body image of said 2D original image of said article is shifted with a plurality of arithmetically increased shift levels respectively.

4. The method of claim 1, wherein said step of shifting every pixel in said main body image of said 2D original image of said article respectively according to said depth model with said main body image outline comprises:
    determining a maximum shift level and a minimum shift level of said every pixel in said main body image of said 2D original image of said article according to gray levels of said depth model with said main body image outline; and
    calculating a plurality of arithmetically increased intermediate shift levels with an arithmetic progression between said maximum shift level and said minimum shift level of said every pixel.

5. The method of claim 1, wherein said equation comprises a linear equation or a nonlinear equation.

6. The method of claim 5, wherein said nonlinear equation comprises a Gamma curve.

7. The method of claim 1, wherein said equation comprises a polynomial equation.

8. The method of claim 1, wherein said background image comprises a pure color background, wherein said pure color background comprises a blue background or a green background.

* * * * *